United States Patent [19]
Fritz et al.

[11] Patent Number: 5,611,838
[45] Date of Patent: Mar. 18, 1997

[54] PROCESS FOR PRODUCING AN IRON MELT

[75] Inventors: Ernst Fritz; Stefan Dimitrov, both of Linz, Austria

[73] Assignee: Voest-Alpine Industrieanlagenbau GmbH, Linz, Austria

[21] Appl. No.: 350,952

[22] Filed: Dec. 7, 1994

[30] Foreign Application Priority Data

Dec. 10, 1993 [AT] Austria ............................ 2495/93

[51] Int. Cl.⁶ .................................................. C21B 13/12
[52] U.S. Cl. ............................................................. 75/10.38
[58] Field of Search ................................. 75/10.38, 10.41

[56] References Cited

U.S. PATENT DOCUMENTS

| | | | |
|---|---|---|---|
| 5,366,538 | 11/1994 | Berger et al. | 75/10.38 |
| 5,378,261 | 1/1995 | Aizatulor et al. | 75/528 |

FOREIGN PATENT DOCUMENTS

| | | |
|---|---|---|
| 0087405 | 8/1983 | European Pat. Off. . |
| 0115756 | 8/1984 | European Pat. Off. . |
| 0418656 | 3/1991 | European Pat. Off. . |
| 0579591 | 1/1994 | European Pat. Off. . |
| 0637634 | 2/1995 | European Pat. Off. . |
| 2634787 | 2/1990 | France . |
| 228831 | 10/1985 | Germany . |

*Primary Examiner*—Melvyn Andrews
*Attorney, Agent, or Firm*—Ostrolenk, Faber, Gerb & Soffen, LLP

[57] ABSTRACT

There is disclosed a process for producing an iron melt in a reactor with current supply. In order to utilize fine-grained iron carriers in a particularly economic manner while minimizing the energy input when carrying out such process in an electric arc furnace, it is proceeded in the following manner:

an iron melt is provided in the electric arc furnace, a foamed slag is provided and maintained on the iron melt, fine-grained iron carriers, such as metallurgical dusts, fine ores, iron carbide, dust from the production of directly reduced iron, scales, dried metallurgical slurries, etc., are introduced into the foamed slag continuously or discontinuously, fine-grained carbon-containing reducing agents, such as coal, coke, wood, graphite, synthetic materials, etc. are supplied into the foamed slag continuously or discontinuously and fine-grained carbon-containing energy carriers additionally are introduced into the foamed slag continuously or discontinuously for furnishing the required process heat, process gases forming during reduction and carbon-containing energy carriers are burnt to $CO_2$ and $H_2O$ within the foamed slag for further furnishing locally required process heat, and the process course is accelerated by introducing gases and/or gas mixtures into the iron melt.

35 Claims, 1 Drawing Sheet

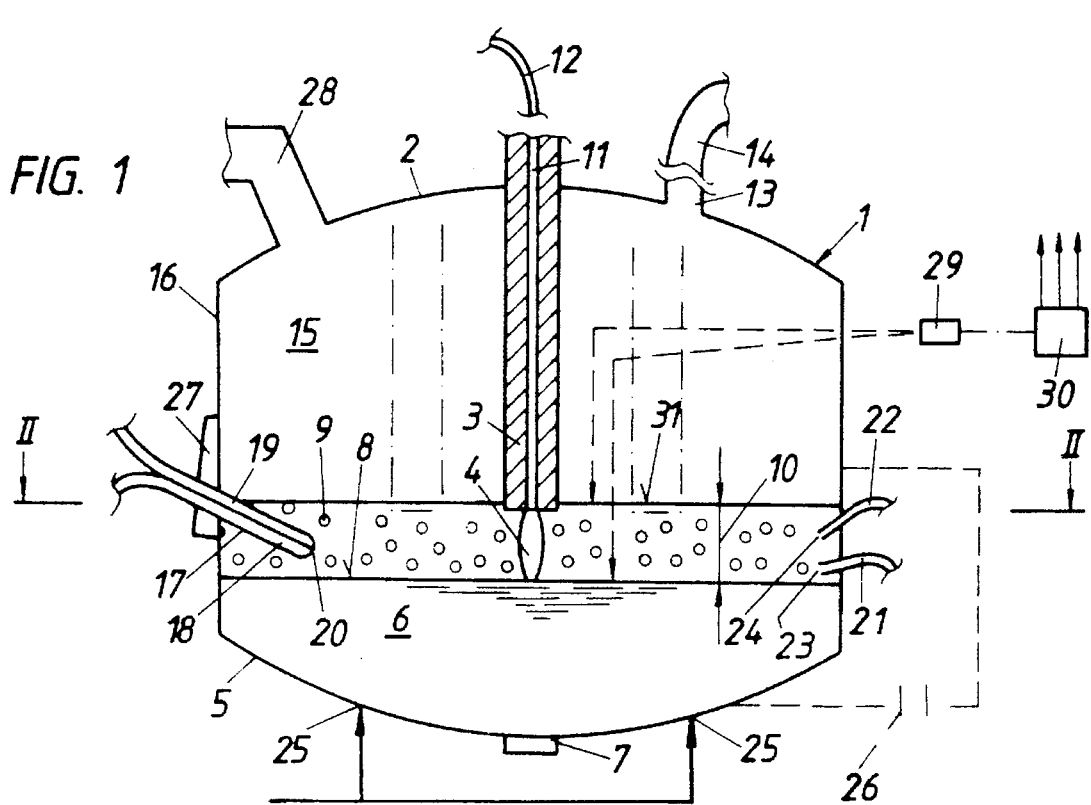
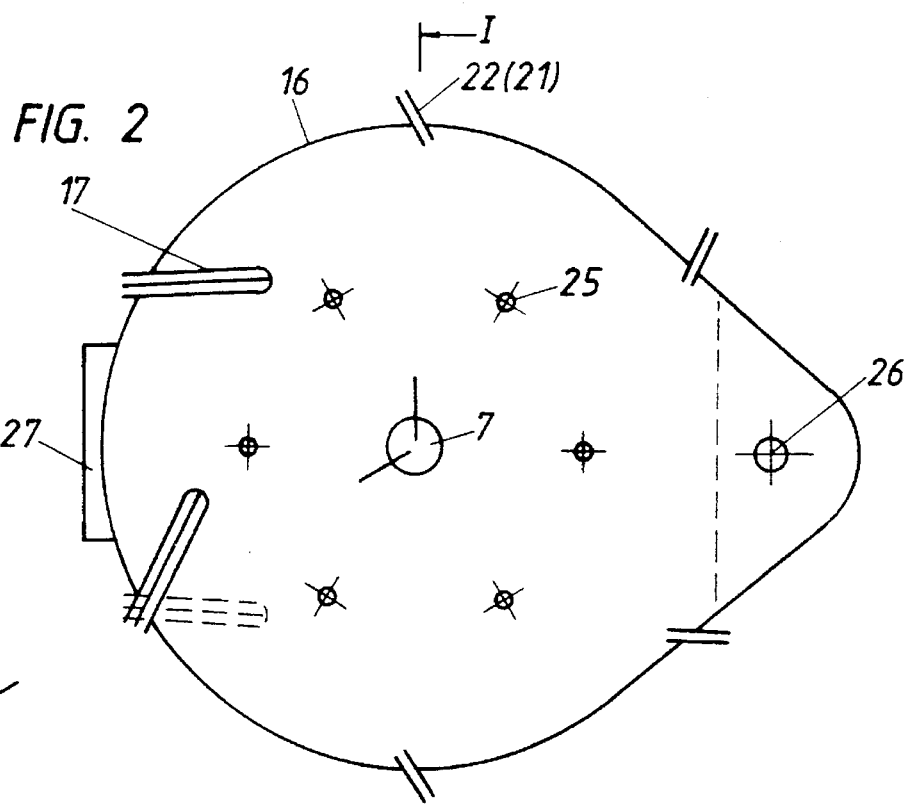

PROCESS FOR PRODUCING AN IRON MELT

The invention relates to a process for producing an iron melt, in particular a steel melt, in a reactor with current supply, such as, e.g., an electric arc furnace, as well as a plant for carrying out the process.

It is internally known to introduce filter dusts forming in the production of steel into an electric arc furnace for the production of steel through hollow electrodes by aid of an inert gas. However, in doing so it has been shown that the utilization of filter dusts, i.e., their processing to steel, is not possible, a large portion of the filter dusts again leaving the electric arc furnace in a more or less unchanged state such that the load on the environment resulting from such filter dusts continues to remain nearly the same.

From EP-A-0 418 656 a process for introducing a gas and fine-grained solids into a metal melt is known, wherein a gas is fed through a first lance and the solids are supplied as a conveyor flow via a second lance in a manner that, after having left the outlet opening of the second lance, they are diverted by gas emerging from the first lance and are supplied to the metal melt together with the same without any remarkable losses occurring due to solids migrating into regions located above the metal melt.

In doing so, the gas emerges from the first lance at a speed lying in the ultrasonic range, the solids, thus, being conveyed not only towards the surface of the metal melt, but into the metal melt. However, this involves the drawback of an endothermic reaction taking place in case of the production of steel. Iron oxide and carbon monoxide are being formed. Since the temperature of the metal melt is lowered thereby and the carbon is reacted to CO only, the coal introduced can function as an energy carrier only to a very limited extent; complete reduction in such a case is feasible only at high carbon contents and consumptions. The amount of solids m be introduced per blow-in site is very limited because of the unfavorable local energy formation.

The invention has as its object to avoid these disadvantages and difficulties and has as its object to provide a process of the initially defined kind as well as a plant for carrying out the process, which render feasible a particularly economical utilization of fine-grained iron carriers, in particular, metallurgical dusts, even at large charging amounts while minimizing the energy input, wherein losses due to the fine-grained iron carriers migrating out of the electric furnace in an unchanged form are largely avoided such that the utilization of filter dusts is feasible without causing any load on the environment. In accordance with the invention, this object is achieved by the combination of the following characteristic features:

that an iron melt is provided in the reactor with current supply, that a foamed slag is provided and maintained on the iron melt, that fine-grained iron carriers, such as metallurgical dusts, fine ores, iron carbide, dust from the production of directly reduced iron, scales, dried metallurgical slurries, etc. are introduced into the foamed slag continuously or discontinuously, that fine-grained carbon-containing reducing agents, such as coal, coke, wood, graphite, synthetic materials, etc. are supplied into the foamed slag continuously or discontinuously and that fine-grained carbon-containing energy carriers additionally are introduced into the foamed slag continuously or discontinuously for furnishing the required process heat, that process gases forming during reduction and carbon-containing energy carriers are largely burnt to $CO_2$ and $H_2O$ within the foamed slag for further furnishing the locally required process heat, and that the process course is accelerated by introducing gases and/or gas mixtures into the iron melt.

Relevant to the invention is the introduction of fine-grained substances into the foamed slag, because thereby it is possible to prevent a back reduction of the $CO_2$ forming in the reduction of the iron carriers, a substantial saving of energy, thus, being feasible. The iron melt either constitutes a residual steel amount of the previous melting period or is previously produced by melting lumpy iron carriers (if desired under supply of liquid iron carriers). Carbon-containing charging materials also may comprise synthetic materials and graphite.

The optimum process course may be achieved by supplying the fine-grained iron carriers in locally limited regions and the fine grained carbon-containing reducing agents also in these regions, wherein suitably also the fine-grained carbon-containing energy carriers are supplied in the locally limited regions in which the fine-grained iron carriers are charged.

For process acceleration, inert and/or reducing and/or oxidizing gas preferably are directly injected into the iron melt, preferably from below. An efficient process course may be achieved by introducing the fine-grained iron carriers, the fine-grained carbon-containing reducing agents and energy carriers in several locally limited peripheral regions of the reactor.

In order to provide for the continuity of the process according to the invention, the layer height of the foamed slag advantageously is maintained at a predetermined minimum value, preferably is controlled to keep this minimum value, wherein suitably level measuring of the layer height of the foamed slag is carried out several times or continuously during a furnace heat and a foamed slag enveloping an electric arc produced by at least one electrode is formed by blowing solids, gases or a mixture of solids and gases into and/or onto the foamed slag or the iron melt, the layer height of which foamed slag is dimensioned such that the foamed slag extends at least over the entire electric arc.

The process according to the invention renders feasible the utilization of large amounts of fine-grained iron carriers. The blowing rate per minute for the fine-grained iron carriers suitably ranges between one thousandth and some hundredths of the tap weight of the reactor, i.e., advantageously between 20 kg/min and 2000 kg/min. By the process according to the invention, it is possible to introduce fine-grained iron carriers at an amount of up to 80% of the weight of the overall charge of the reactor. When operating with residual melt in the furnace, the total tap may derive from said fine-grained iron carriers.

Advantageously, the fine-grained materials are supplied pneumatically, wherein oxygen, air, nitrogen, argon, hydrocarbons, such as natural gas, water vapor, carbon dioxide or mixtures of these gases are used as conveying gases. According to a preferred embodiment, fine-grained iron carriers and, if desired, fine-grained carbon-containing materials are blown in through at least one hollow electrode by means of a carrier gas.

Suitably, fine-grained iron carriers and fine-grained carbon-containing materials are blown into the foamed slag formed on the surface of the iron melt through at least one lateral lance and/or pair of tuyeres passing through the side wall of the reactor, by means of a carrier gas, wherein oxygen or oxygen-containing gases is (are) blown into the foamed slag through at least one lateral lance and/or tuyere passing through the side wall of the reactor.

Lumpy materials likewise may be utilized by the process according to the invention. Advantageously, these are introduced through an opening or several openings provided in the furnace lid.

Suitably, the sensible heat of hot offgases escaping from the electric arc furnace are used for preheating at least part of the solids introduced, and/or gases injected, into the electric arc furnace.

According to another preferred embodiment, the production of molten steel is effected continuously or semi-continuously by using a plant comprising a reactor optionally including a melt-reduction part.

A plant for carrying out the process of the invention is characterized by the combination of the following characteristic features:

a reactor with current supply, such as an electric arc furnace, comprising at least one electrode, supply means for fine-grained iron carriers, fine-grained carbon-containing reducing agents and fine-grained carbon-containing energy carriers, whose outlet openings are arranged on a height level of the electric arc furnace on which the latter comprises a layer of foamed slag during operation, and gas supply means provided in the vicinity of the supply means for the fine-grained solids and whose mouths also are located on the height level over which the foamed slag extends, the mouths of the gas supply means advantageously each lying above the mouths of the solids supply means.

According to a preferred embodiment, the supplied gas and the supplied solids are feedable by means of at least one lateral lance passing through the side wall of the reactor, said lateral lance having separate flow cross sections for the gas and the solids as far as to its mouth.

Another preferred embodiment is characterized in that at least one electrode having a central longitudinal recess is provided, into which a duct supplying fine-grained solids and/or gas enters.

Advantageously, tuyeres or flushing bricks are provided in the bottom of the reactor. Preferably, the tuyeres are protected by natural gas.

In order to maintain a foamed slag having a predetermined minimum height, a level measuring means including a control loop advantageously is provided for measuring the layer height of the foamed slag present on the iron melt, which level measuring means is coupled with the supply means for the solids and/or gases and/or solids-gas mixtures. Suitably, the mouths of the gas supply means and the mouths of the supply means for the fine-grained iron carriers, reducing agents and energy carriers are directed obliquely downwards towards the bottom tuyeres.

In the following, the invention will be explained in more detail by way of an exemplary embodiment and with reference to the accompanying drawing schematically illustrating an electric arc furnace according to the invention, wherein:

FIG. 1 is a vertical section through an electric arc furnace according to the invention along line I—I of FIG. 2, and FIG. 2 is a horizontal section of the same along line II—II of FIG. 1.

A self-consuming graphite electrode 3 centrally projects into an electric arc furnace 1 from above through the lid 2 of the same, its electric arc 4 burning towards a steel melt 6 that covers the bottom 5 of the electric arc furnace 1. A counter electrode 7 is arranged in the bottom 5. The embodiment illustrated represents a direct current electric arc furnace having but one electrode. However, there might also be provided several self-consuming graphite electrodes 3—as is indicated by dot-and-dash lines—, which may be operated with alternating or rotary current.

A layer of foamed slag 9 having a predetermined layer height 10 is present on the steel bath surface 8. The self-consuming graphite electrode 3 is designed as a hollow electrode. Through its internal central longitudinal recess 11, which suitably is provided with an internal lining of $Al_2O_3$-containing tubes (corundum, sillimanite, etc.) or steel, fine-grained solids and/or gases or mixtures of solids and gases may be supplied via a duct 12, thus immediately getting into the electric arc furnace 4. The lid 2 of the electric arc furnace 1, furthermore, comprises a lid opening 13, through which lumpy solids, lump coal or coke, lump ores, filter dust pellets or briquets and/or fluxes supplied by a supply duct 14 may be introduced into the interior 15 of the electric arc furnace 1. Through the side wall 16 of the electric arc furnace 1, one or several lances 17, which are movably or rigidly arranged relative to the same and either are protected by cooling water or cooling gas or—if not protected—are self-consuming, project into the interior 15 of the electric arc furnace 1. In the operating position, the lances 17 are directed obliquely towards the bottom 5. They may be movably arranged in the side wall 16, i.e., capable of being inclined, pivoted and displaced and retracted. Stationary installation in the side wall 16 also is conceivable.

The lances 17, as far as to mouth 20, each have separate flow cross sections 18, 19 for supplying gas and solids such that the solids conveyed to mouth 20 by a gaseous conveying medium will mix with the separately fed gas only at or upon emergence from the mouth. During operation of the electric arc furnace 1, the mouths 20 of the lances 17 are located on a height level above which the foamed slag 9 extends.

In addition to these lances 17, the electric arc furnace 1 comprises pairs of tuyeres 21, 22 passing through its side wall 16, the mouths 23, 24 of the pairs of tuyeres 21, 22 likewise being located on a height level above which the foamed slag 9 extends. Each pair of tuyeres 21, 22 is formed by an upper tuyere 22 and a further tuyere 21 located approximately vertical below this tuyere 22. Through the upper tuyere oxygen or an oxygen-containing gas, and through the lower tuyere 21 fine-grained solids by aid of a conveying gas, are introduced into the interior 15 of the electric arc furnace 1. Suitably, the tuyeres 21, 22 are arranged in the side wall 16 also in a movable manner (inclinable as well as extractable and retractable).

As is apparent, in particular, from FIG. 2, the gases and solids—in accordance with the arrangement of the lances 17 and of the tuyeres 21, 22—are introduced into the furnace interior in a manner approximately uniformly distributed about its periphery. Instead of the lances, pairs of tuyeres 21, 22 could again be provided, or, vice versa, the tuyeres 21, 22 also could be replaced with lances 17.

In the bottom 5 of the electric arc furnace 1, tuyeres 25, preferably protected by natural gas, or flushing bricks are provided, through which reducing or oxidizing or inert gases that serve to accelerate the steel production process by intensifying the movement of the bath may be injected. Thereby, the rapid reduction or elimination of temperature and concentration gradients within the steel bath 6 and, in particular, within the foamed slag 9 as well as an accelerated mass transfer and the maintenance of a quasi-stationary process course are feasible. When using $O_2$/hydrocarbon tuyeres, high-pressure oxygen of, for instance, 20 to 90 bar has proved particularly suitable because of its good controllability.

According to the exemplary embodiment illustrated, the electric arc furnace 1 comprises a bottom tap 26; however, there could also be provided a skimmer tap. The slag tap is denoted by 27.

The offgas forming in the interior 15 of the electric arc furnace 1 is fed to a filtering plant (not illustrated) via an offgas duct 28. The sensible heat of the offgases subsequently may be used for preheating at least part of the solids charged, and/or gases injected, into the electric arc furnace 1, either without or with partial after-burning of the offgases. Preheating is effected by conducting the offgases through suitable preheating means, such as, e.g., a preheating shaft and/or whirling bed or rotary tubular reactors and/or other heat exchangers. Primarily when charging iron carriers having low reduction degrees (ore, filter dust, ect.), an additional prereduction is also achieved parallel to preheating, further lowering the demand of heat for their subsequent melt reduction in the electric arc furnace 1 and—at a suitable temperature control in the preheater—, moreover, resulting in a partial carbon recovery for the melt reduction in the electric arc furnace by the separation of C or carburization of the iron carriers in the preheater according to the Bouduard equilibrium.

The height of the foamed slag 9 may be detected by aid of a level measuring means 29, which, for instance, is designed as a sound measuring means, a high-temperature measuring means or a high-temperature video camera or as a high-temperature radar, wherein the measured signal of the level measuring means is used for controlling the height 10 of the foamed slag 9, for instance, by feeding it to a control loop 30 whose output signals are transmitted to automatic control devices for controlling the solids and/or gases and/or mixtures of solids and gases introduced. However, it is also possible to transmit an appropriate information to the operator on the furnace control stand, the latter consequently placing automatic control devices into appropriate positions.

It is important that the electric arc 4 be totally surrounded by foamed slag throughout the major part of the production process even at a great length such that the heat given off there can be utilized very effectively for realizing the endothermic melt reduction, thus leading to a higher productivity at relatively low current and electrode consumptions.

To illustrate the process course according to the invention, the production of a steel melt in an electric arc furnace by utilizing iron-containing filter dusts incurring in a metallurgical plant will be explained by way of a concrete exemplary embodiment:

In a 125 ton DC electric arc furnace comprising a hollow electrode, metallurgical filter dust (grain size <1 mm) having the following composition is processed:

| Component | % by weight |
|---|---|
| $Fe_{tot}$ (95% oxidic) | 66.0 |
| C | 6.0 |
| Cl | 0.5 |
| Ni | 0.04 |
| Alkali (Na, K) | 0.5 |
| Cu | 0.1 |
| $Cr_2O_3$ | 0.3 |
| CaO | 1.5 |
| $SiO_2$ | 1.2 |
| $TiO_2$ | 0.1 |
| ZnO | 1.5 |
| PbO | 0.5 |
| $H_2O$ | 1.0 |

In addition to this filter dust, the following reducing agents and/or energy carriers and fluxes were charged:

fine-grained coal (anthracite coal, grain size <1.5 mm) having the composition (in % by weight):

| | | |
|---|---|---|
| 87.8% C | 0.13% CaO | 0.1% MgO |
| 3.5% $SiO_2$ | 2.5% $Al_2O_3$ | 1.4% $H_2O$ |
| 0.4% S | Balance: volatile components | | soft-burnt lime (piece size 15 to 40 mm) having the composition (in % by weight):

| | | |
|---|---|---|
| 92.5% CaO | 1.5% MgO | 1.3% $SiO_2$ |
| 1.8% $Al_2O_3$ | 0.2% $Fe_2O_3$ | 1.5% $CO_2$ |
| 1.0% $H_2O$ | 0.04% S | |

Fluor spar (piece size 10 to 40 mm) having the composition (in % by weight):

| | | |
|---|---|---|
| 87.5% $CaF_2$ | 3.0% CaO | 5.0% $SiO_2$ |
| 1.0% $Al_2O_3$ | 2.0% $CO_2$ | 1.1% $H_2O$ |
| 0.27% S | | |

Gases: $O_2$, air (dry), $N_2$, Ar, $CH_4$

The fine-grained charging substances (filter dust and coal) were supplied into the bath pneumatically up to 100%. The addition of lumpy slag formers was effected via the lid opening 13.

To carry out the process according to the invention, a 125 ton DC electric arc furnace 1 as illustrated in FIGS. 1 und 2 was used, which, in detail, was equipped as follows:

| | |
|---|---|
| Transfo performance | 100 MVA (800 kVA/t liquid) |
| Electrode design | 1 hollow electrode 3 of graphite having an internal lining of corundum tube |
| Blow-in lances and tuyeres | 2 water-cooled movable lateral lances 17 through furnace wall for dust and coal and/or $O_2$ |
| | 4 tangentially and firmly installed tuyeres 21 protrcted by natural gas in side wall 16 for dust + coal (lower tuyere plane in FIG. 1) |
| | 4 tangentially and firmly installed tuyeres 22 protected by natural gas in side wall 16 for $O_2$ (upper tuyere plane in FIG. 1) |
| | 6 bottom tuyeres 25 for $N_2$/Ar changeover (to improve the tuyere lives a bit of $CH_4$ was admixed). |

At first, steel scrap (one cage) was charged into the empty furnace and melted down by means of the electrode while top-blowing fine-grained coal and $O_2$. The coal was introduced through the lances 17 as well as through the tuyeres 21 of the lower plane, the oxygen was injected through the lances 17 and the tuyeres 22 of the upper plane. After this, the temperature of the steel sump formed (about 60 tons) was increased to 1620° C., its C-content amounting to 0.15%. The amount of furnace slag formed, after the addition of slag formers, was about 6 tons. Under these bath conditions, filter dust was started to be blown in.

Through the hollow electrode 3, the lances 17 as well as the tuyeres 21 of the lower tuyere plane, a filter dust—coal mixture was blown in by aid of $N_2$ carrier gas below the surface 31 of the foamed slag 9, yet above the surface 8 of the steel bath 6. The blow-in rate was 500 kg filter dust/rain so that a total of 20 tons of filter dust was blown in within 40 min. During the blowing in of dust, $O_2$ also was blown into the foamed slag 9 through the lances 17 and the tuyeres 22 of the upper tuyere plane. Thereby, both an oxidation of the so called "combustion coal" within the oxide plus coal mixture and a partial afterburning of the primarily formed CO from the "combustion coal" and the melt reduction to $CO_2$ within the foamed slag are obtained, resulting in further heat sources in addition to the electric arc 4.

$N_2+CH_4$ was injected through the bottom tuyeres 25 as a bottom flushing gas. Lump lime was added through the lid opening 13. During the total dust blow-in period, a well foaming slag 9 was obtained, completely surrounding the electric arc 4 almost throughout the total dust blow-in period. The following bath conditions were attained:

Temperature: 1600±20° C.

(% C): 0.07±0.03

(% $FeO_n$): 20±5

(% CaO)/(% $SiO_2$): 2.2±0.2

Thickness of foamed slag layer: 600–900 mm

DC electric arc length (at approximately 600 V and 100 kA): about 700 mm

The results from the test melt in terms of charging substances, products and electric energy consumption during the blowing in of filter dust may be summarized as follows:

| Operational parameters | Consumption | |
|---|---|---|
| | per ton filter dust | per min blow-in-time |
| A) Charging substances (all at 25° C.) | | |
| 1) Filter dust | 1000 kg | 500 kg |
| 2) Coal dust | 85 kg | 42.5 kg |
| 3) $O_2$ | 25 $Nm^3$ | 12.5 $Nm^3$ |
| 4) $N_2$ (carrier gas/bottom flushing) | 110/3 $Nm^3$ | 55/1.5 $Nm^3$ |
| 5) Lime | 20 kg | 10 kg |
| B) Products (all at 1600° C.) | | |
| 1) Molten steel (0.07% C) | 654 kg | 327 kg |
| 2) Slag (% $FeO_n$ = 20%, % CaO/% $SiO_2$ = 2.2) | 73 kg | 36.5 kg |
| 3) Offgas (CO-afterburning degree = 20%) | 384 $Nm^3$ | 192 $Nm^3$ |
| C) Electric energy consumption | 1420 kWh | 710 kWh |

At the end of the filter dust blow-in period, the amount of steel within the furnace was about 73 tons. The amount of slag was about 7.5 tons. While, according to the invention, the melt reduction of the iron carriers supplied preferably runs continuously at a temperature ranging between about 1500° and 1650° C., the foamed slag 9 via slag tap 27, and the produced steel melt 6 via bottom tap 26, are partially tapped from time to time (while interrupting the supply of current and fine-grained solids because of the discontinuous process course caused by the electric arc furnace) such that a certain amount of residual slag and/or a certain steel sump will remain in the furnace as the minimum amount for a troublefree continuation of the melt reduction. A steel sump may also be built up by melting (even lumpy) iron carriers. By further secondary metallurgical treatment, the steel melt (crude steel) produced is brought to the composition and temperature desired for casting.

If the process according to the invention is performed in a conventional DC or AC electric arc furnace, a discontinuous process course is suitable. When using a plant comprising an electric arc furnace or a melt or melt reduction section similar to an electric arc furnace for the production of molten steel, a continuous or semi-continuous process course is feasible, too. Moreover, the process also may be applied in combination with common electric arc furnace operation— as an additional process step or parallel to smelting (e.g., scrap and/or sponge iron) and/or refining and/or overheating of the melt in the flat bath operation.

With discontinuous operation, the fine-grained iron carriers—in particular, metallurgical dusts (filter dusts from converters, electric arc furnaces, blast furnaces, melt reduction plants, etc.), fine ores with or without prereduction, iron carbide, DRE fines, scales, dried and comminuted slurry, etc.—according to the invention may be supplied to the electric arc furnace up to a portion of 80% of the total iron charge and may partially or completely be replaced with compounds of non-iron metals (e.g., Ni, Cr, Mo, Mn, etc.).

The fine-grained C-containing reducing agents preferably comprise coal, coke, graphite, synthetic materials, wood, etc. or mixtures thereof. Low-priced fine-grained FeSi, Al or other reducing agents may also be used. The gases fed essentially consist of $O_2$, air, $N_2$, Ar, natural gas or other hydrocarbons, $H_2O$ (vapor), $CO_2$ or mixtures thereof. Hydrocarbon also may be fed in the liquid state. In particular, air, and also the inert gases may be preheated. According to the invention, fossil energy carriers and electric energy may be combined to furnish the process heat required for carrying out the process. This offers the possibility of substituting the major portion of the electric energy required or of lowering the current consumption by cheaper primary energy; according to the invention, the overall coal consumption, for instance, results from the socalled "reduction coal" (reaction coal) and the socalled "heating coal" (substitute for electric energy). In addition, energy may be introduced by aid of afterburning lances operated by $O_2$ and/or air and blowing onto or into the slag.

A substantial advantage of the process according to the invention is to be seen in that the working up, and hence disposal, of metallurgical dusts incurring is feasible under simultaneous recovery and/or enrichment of their components (enrichment to concentrations at which the further disposal of waste products can be realized in an economic manner). A field of application of the process according to the invention is the disposal of toxic wastes or wastes that constitute a load on the environment, such as shredding waste, synthetic granulates, dried sewage, etc., including the recovery of their valuable components while utilizing their energy content.

What we claim is:

1. A process for producing an iron melt in a reactor with current supply, which process comprises in combination:

providing an iron melt in said reactor with current supply, providing and maintaining a foamed slag on said iron melt, introducing fine-grained iron carriers into said foamed slag, supplying fine-grained carbon-containing reducing agents into said foamed slag, additionally introducing fine-grained carbon-containing energy carriers into said foamed slag for furnishing required process heat, largely burning process gases forming during reduction and carbon-containing energy carriers to $CO_2$ and $H_2O$ within said formed slag for further furnishing locally required process heat, accelerating the process course by introducing at least one of gases and gas mixtures into said iron melt; and withdrawing iron melt and slag through respective taps.

2. A process as set forth in claim 1, wherein said fine-grained iron carriers are selected from the group consisting of metallurgical dusts, fine ores, iron carbide, dust from the production of directly reduced iron, scales and dried metallurgical slurries.

3. A process as set forth in claim 1, wherein said fine-grained carbon-containing reducing agents are selected from the group consisting of coal, coke, graphite, synthetic reducing agents and wood.

4. A process as set forth in claim 1, wherein at least one of said fine-grained iron carriers, said fine-grained carbon-containing reducing agents and said fine-grained carbon-containing energy carriers are introduced continuously.

5. A process as set forth in claim 1, wherein at least one of said fine-grained iron carriers, said fine-grained carbon-containing reducing agents and said fine-grained carbon-containing energy carriers are introduced discontinuously.

6. A process as set forth in claim 1, further comprising providing locally limited regions for supplying said fine-grained iron carriers and said fine-grained carbon-containing reducing agents.

7. A process as set forth in claim 1, further comprising providing locally limited regions for supplying said fine-grained iron carriers and said fine-grained carbon-containing energy carriers.

8. A process as set forth in claim 1, wherein at least one gas selected from the group consisting of inert gas, reducing gas and oxidizing gas is directly injected into said iron melt for process acceleration.

9. A process as set forth in claim 8, wherein said at least one gas is injected from below.

10. A process as set forth in claim 1, further comprising providing several locally limited peripheral regions of said reactor for introducing said fine-grained iron carriers, said fine-grained carbon-containing reducing agents and said fine-grained carbon-containing energy carriers.

11. A process as set forth in claim 1, wherein said reactor is an electric arc furnace having a furnace lid and at least one furnace lid opening is provided for additionally introducing lumpy materials.

12. A process as set forth in claim 11, wherein said lumpy materials are selected from the group consisting of lump coal, lump ore, directly reduced iron, scrap and/or filter dust pellets and/or filter dust briquets and slag formers.

13. A process as set forth in claim 1, further comprising
providing at least one electrode for producing an electric arc,
level-measuring, during a furnace heat, said foamed slag layer height and blowing one of solids, gases and a mixture of solids and gases at least one of into and onto one of said foamed slag and said iron melt so as to form an electric-arc-enveloping foamed slag having a layer height dimensioned such that said electric-arc-enveloping foamed slag at least extends over all of said electric arc.

14. A process as set forth in claim 13, wherein said level-measuring is carried out several times.

15. A process as set forth in claim 13, wherein said level-measuring is carried out continuously.

16. A process as set forth in claim 1, wherein said fine-grained iron carriers are introduced at a blowing rate per minute that ranges between one thousandth and some hundredths of the tap weight of said reactor.

17. A process as set forth in claim 1, wherein said fine-grained iron carriers are blown in at a blowing rate ranging between 20 kg/min and 2000 kg/min.

18. A process as set forth in claim 1, wherein said fine-grained iron carriers are introduced in an amount of up to 80% of the overall charge weight.

19. A process as set forth in claim 1, further comprising providing a conveying gas for pneumatically supplying said fine-grained iron carriers, said fine-grained carbon-containing reducing agents and said fine-grained carbon-containing energy carriers.

20. A process as set forth in claim 19, wherein said conveying gas is selected from the group consisting of oxygen, air, nitrogen, argon, hydrocarbons, water vapor, carbon dioxide and mixtures thereof.

21. A process as set forth in claim 20, wherein said hydrocarbons comprise natural gas.

22. A process as set forth in claim 1, further comprising providing at least one hollow electrode and a carrier gas for blowing in said fine-grained iron carriers through said at least one hollow electrode.

23. A process as set forth in claim 22, further comprising blowing in fine-grained carbon-containing materials through said at least one hollow electrode by means of said carrier gas.

24. A process as set forth in claim 1, wherein said reactor has a side wall and which process further comprises
arranging a first supply means to pass through said side wall of said reactor and providing a carrier gas for blowing said fine-grained iron carriers and said fine-grained carbon-containing reducing agents and energy carriers through said first supply means into said foamed slag formed on the surface of said iron melt, and
arranging a second supply means to pass through said side wall of said reactor for feeding at least one of oxygen and an oxygen-containing gas into said foamed slag.

25. A process as set forth in claim 24, wherein said first supply means is comprised of at least one lateral lance.

26. A process as set forth in claim 24, wherein said first supply means is comprised of a pair of tuyeres.

27. A process as set forth in claim 24, wherein said first supply means is comprised of at least one lateral lance and a pair of tuyeres.

28. A process as set forth in claim 24, wherein said second supply means is comprised of at least one lateral lance.

29. A process as set forth in claim 24, wherein said second supply means is comprised of at least one tuyere.

30. A process as set forth in claim 24, wherein said second supply means is comprised of at least one lateral lance and at least one tuyere.

31. A process as set forth in claim 1, wherein said reactor is an electric arc furnace and hot offgases having a sensible heat escape from said electric arc furnace, and which further comprises using said sensible heat of said offgases for preheating at least part of at least one of said solids and gases introduced into said reactor.

32. A process as set forth in claim 1 carried out in a plant comprising a reactor for producing molten steel.

33. A process as set forth in claim 32, wherein said reactor comprises a melt reduction part.

34. A process as set forth in claim 32, wherein said molten steel is produced continuously.

35. A process as set forth in claim 32, wherein said molten steel is produced semi-continuously.

* * * * *